(12) United States Patent
Sawaya et al.

(10) Patent No.: US 8,635,188 B2
(45) Date of Patent: Jan. 21, 2014

(54) TECHNIQUES FOR EXTRACTING DATA FROM CONTENT DATABASES

(75) Inventors: Samer Fouad Sawaya, Snoqualmie, WA (US); Patrick J. Simek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1166 days.

(21) Appl. No.: 12/137,556

(22) Filed: Jun. 12, 2008

(65) Prior Publication Data

US 2009/0313280 A1  Dec. 17, 2009

(51) Int. Cl.
*G06F 7/00* (2006.01)
*G06F 17/00* (2006.01)
*G06F 17/30* (2006.01)

(52) U.S. Cl.
USPC .......................... 707/649; 707/609; 707/662

(58) Field of Classification Search
USPC ................. 707/100, 103, 204; 709/225, 316; 379/88.25
See application file for complete search history.

(56) References Cited

U.S. PATENT DOCUMENTS

| | | | |
|---|---|---|---|
| 4,864,497 A | | 9/1989 | Lowry et al. |
| 6,233,623 B1 * | | 5/2001 | Jeffords et al. ............... 719/316 |
| 6,480,862 B1 * | | 11/2002 | Gall ..................................... 1/1 |
| 6,658,589 B1 | | 12/2003 | Taylor |
| 6,754,679 B2 | | 6/2004 | Oheda |
| 6,772,177 B2 | | 8/2004 | Mehta et al. |
| 6,910,112 B2 | | 6/2005 | Berkowitz et al. |
| 6,944,662 B2 * | | 9/2005 | Devine et al. ................. 709/225 |
| 7,158,978 B2 * | | 1/2007 | Goodwin .............................. 1/1 |
| 7,206,391 B2 * | | 4/2007 | Chiu et al. ................. 379/88.25 |
| 2003/0204516 A1 | | 10/2003 | Klosterhalfen et al. |
| 2004/0139128 A1 * | | 7/2004 | Becker et al. ................. 707/204 |
| 2005/0015386 A1 | | 1/2005 | Mortensen et al. |
| 2005/0166082 A1 | | 7/2005 | Williams et al. |
| 2007/0156700 A1 | | 7/2007 | Becker |
| 2007/0180289 A1 | | 8/2007 | Chai et al. |

OTHER PUBLICATIONS

"Troubleshoot and resume upgrade (Office SharePoint Server)", http://technet2.microsoft.com/Office/en-us/library/8c676788-f2bc-412b-b14e-6e13bee3e1301033.mspx?mfr=true.
Harald Kosch, "Distributed Multimedia Database Technologies supported by MPEG-7 and MPEG-21", Nov. 24, 2003, pp. 1-27.

* cited by examiner

*Primary Examiner* — Susan Chen

(57) ABSTRACT

Various technologies and techniques are disclosed for extracting data from databases of content management applications. Input is received from a user to connect to a database of a content management application. A connection is established to the database. When the database is not part of a current live instance of the content management application, an emulation is performed so that the database is treated like it is actually attached to the current live instance of the content management application. The user is able to browse the database. Unattached databases of a content management application can be managed using one or more commands, such as using an object model or command line. Orphaned databases can be detected and deleted from the content management application.

10 Claims, 10 Drawing Sheets

UNATTACHED CONTENT DATABASE RECOVERY – STEP 2 OF 2: CONNECT TO DATABASE

USE THIS PAGE TO SELECT THE SITE COLLECTION, SITE, OR LIST TO BACKUP OR EXPORT.

SELECT DATA:
SITE COLLECTION: HTTP://ACME/ ▼ — 262
SITE: NOT SELECTED ▼ — 264
CHANGE SITE / CLEAR SELECTION — 266

OPERATION TO PERFORM:
○ SITE COLLECTION BACKUP — 268
⦿ EXPORT — 270

FILE LOCATION:
FILE NAME: [_____] — 272
274 — ☐ OVERWRITE EXISTING FILES
EXAMPLE: \\BACKUP\SHAREPOINTSITE1.BAK

INCLUDE FULL SECURITY:
☐ INCLUDE FULL SECURITY
276

INCLUDE VERSIONS:
ALL VERSIONS ▼ — 278

EXPORT SETTINGS:
280 — ☐ HALT ON WARNING
282 — ☐ HALT ON ERROR
284 — ☐ NO LOG FILE
286 — CAB SIZE: [24]   1-1024 MEGABYTES — 292
288 — [PREVIOUS]  [OK] — 290   [CANCEL]

FIG. 4

TECHNIQUES FOR EXTRACTING DATA FROM CONTENT DATABASES

BACKGROUND

Web-based content management applications such as MICROSOFT® SharePoint typically include files that are located on a Web server along with data that is stored in a database. For example, one or more web pages that are used to access the data in the database are stored on a web server. In order to make the content accessible to end users, an attachment process is typically utilized to set up the live instance of the content management application. In other words, a site administrator makes the web pages and database "live" to end users so that the data can be accessed and updated.

One of the current issues that arise with content management applications has to do with properly backing up the data contained therein. Due to the fact that content management applications have data stored in more places than just a physical database, a separate information technology organization or team is typically responsible for maintaining and backing up content management applications than is responsible for backing up other databases in the company. This division of responsibility can often pose a problem in corporations since the database backups become disconnected from the maintenance operations being performed by the team responsible for content management applications.

When backups are performed for content management applications, the entire database is typically backed up, along with the directories on the file server that contains the other data for the application. Because entire databases are being backed up, it can be very difficult to go back to a past database backup and extract a specific unit of logical data as it once existed on a company's content management application (such as SharePoint or as similar technology). Users are not able to extract specific data from a database that is not attached to a "live" instance of the content management application. Also, it is not generally possible to know which database backup contains the logical data that a user may be looking for.

SUMMARY

Various technologies and techniques are disclosed for extracting data from databases of content management applications. Input is received from a user to connect to a database of a content management application. A connection is established to the database. When the database is not part of a current live instance of the content management application, an emulation is performed so that the database is treated like it is actually attached to the current live instance of the content management application. The user is able to browse or search the database to find specific data. In one implementation, the user can export selected data and/or backup selected data from the database of the content management application.

In one implementation, unattached databases of a content management application can be managed using one or more commands. Input is received from a user to specify connection options for connecting to an unattached database of a content management application. The connection is established with the unattached database so that the database is treated like it is attached to a live instance of the content management application. The user can use one or more commands to manipulate the unattached database. In one implementation, the commands can be source code that utilizes an object model of the content management application to manipulate the database. In another implementation, the commands can be performed from a command line.

In another implementation, orphaned databases can be detected and deleted from the content management application. A selection is received from a user to connect to a database of a content management application. When the database is part of a current live instance of a content management application, any orphaned sites that are in the database but that are not in an index used to access the content management application are identified. One or more portions of any orphaned sites that were identified are deleted.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a simulated screen for one implementation that illustrates some exemplary data export options for the unattached database selected in FIG. 3.

DETAILED DESCRIPTION

Figure 1:
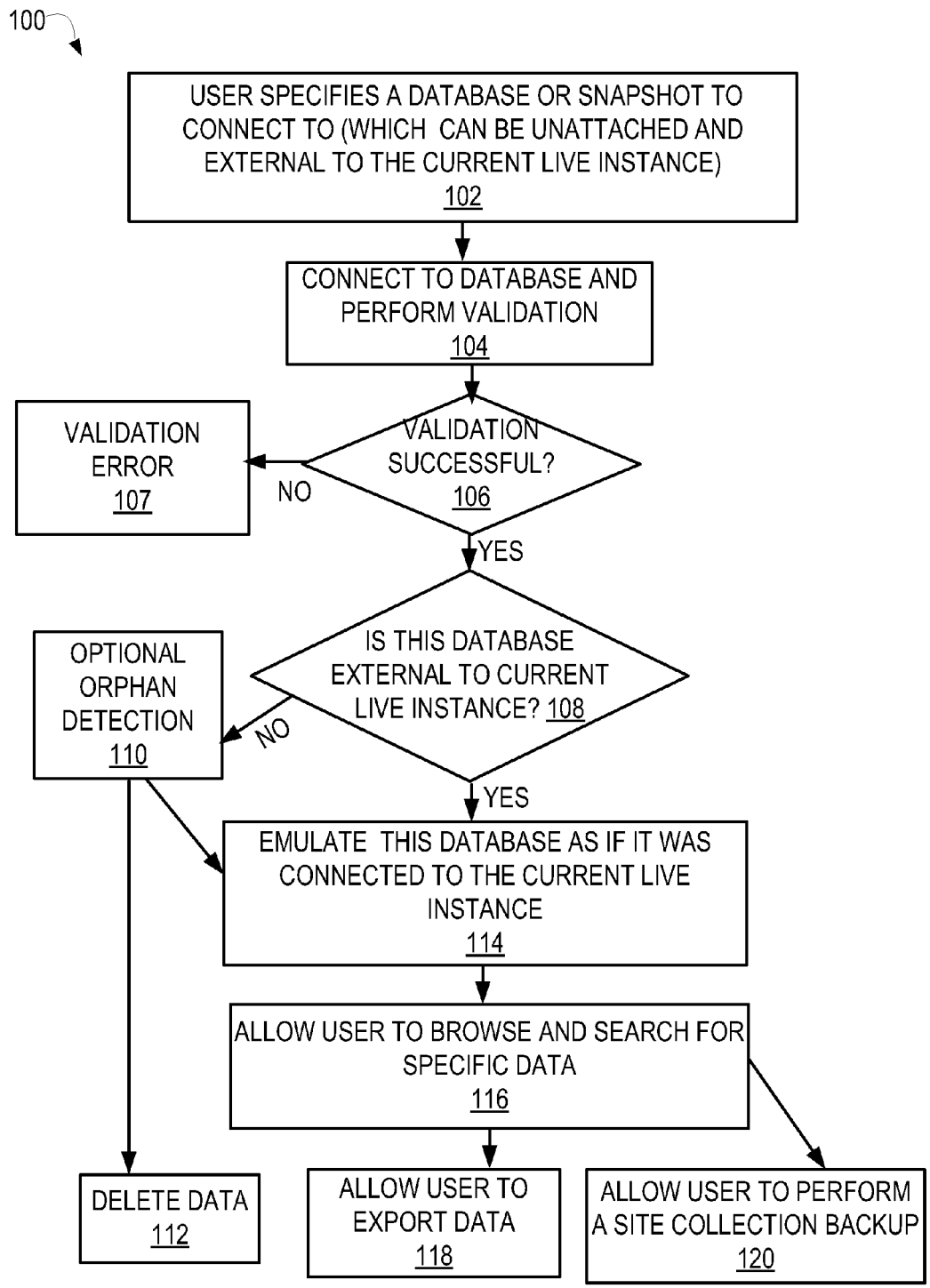
FIG. 1 is a high level process flow diagram for one implementation illustrating the stages involved in extracting data from content databases.

The technologies and techniques herein may be described in the general context as an application for managing databases of content management applications, but the technologies and techniques also serve other purposes in addition to these. In one implementation, one or more of the techniques described herein can be implemented as features within an online content management application such as MICROSOFT® SharePoint, or from any other type of program or service that manages content management applications. In another implementation, one or more of the techniques described herein are implemented as features with other applications that deal with accessing data in and/or extracting data from databases of content management applications.

As noted in the Background section, when backups are performed for content management applications, the entire database is typically backed up, along with the directories on the file server that contains the other data for the application. It can be very difficult to go back to a past database backup and extract a specific unit of logical data as it once existed on a company's content management application. The term "content management application" as used herein is meant to include an application that allows users to store various content in a structured or unstructured format. Examples of a content management application can include an application that provides functionality to allow administrators and/or end users to manage content, or an internet site that uses a database as a back end.

Furthermore, with existing content management applications, users may face difficulty in extracting specific data, especially when the desired data is contained in a database that is not attached to a "live" instance of the content management application. The term "live instance" as used herein is meant to include a running instance of a content management application and the one or more databases that store the data for that application that are attached to that content management system. Also, current systems do not provide the user with ways to determine which database backup of a content management application contains the logical data that a user may be looking for.

With current systems, the administrator typically has to detach the current live instance of the content management application, restore the entire database backup (which could be very large), and then reattach that database backup to the live instance of the content management application. This reattach process can be very burdensome on content management deployments due to the downtime and manpower involved, and can present a large amount of administrative overhead to reattach an old database back to the live instance of the content management application. Furthermore, in order to extract a specific unit of logical data from that database (once attached to the live instance), the user would typically have to write code or run a command line command to export the data, which requires advanced knowledge.

Another option that is sometimes used with current systems is to restore the database of a content management application from a backup to a test server in order to retrieve the desired data. This solution requires the purchase of additional server hardware in order to run a second content management application, plus also requires any extra software licenses. There is also extra maintenance and overhead associated with this option, so it is not usually the most desirable either.

In one implementation, techniques are described for enabling data contained in database backups, database snapshots, and/or databases of content management applications to be browsed, searched, backed up, and/or exported. Databases can be browsed that are unattached from the current live instance of the content management application. The term "unattached database" as used herein is meant to include a database that contains data for a content management application that is not currently activated on a live instance of the content management application. Once a connection is established to the unattached database (database, backup, or snapshot), the data contained in that database can then be accessed from a user interface and/or programmatically, such as from a software development application or command line.

Turning now to FIGS. 1-9, the stages for implementing one or more implementations of the data extraction tool are described in further detail. In some implementations, the processes of FIG. 1-9 are at least partially implemented in the operating logic of computing device 500 (of FIG. 10).

FIG. 1 is a high level process flow diagram 100 for one implementation illustrating the stages involved in extracting data from databases of content management applications. The user specifies a database or a database snapshot to connect to, which can be an unattached database that is external to the current live instance of the content management application (stage 102). A connection is established to the database and a validation process is performed (stage 104). During the validation process, security checks are performed to ensure that this user has authority to access to the database. Database validation is also performed to ensure that the database is a valid version or database schema of the particular content management application. If validation is not successful (decision point 106), then the process ends (stage 107). If validation is successful (decision point 106), and if the database being accessed is part of the live instance of the content management application (decision point 108), then an optional orphan detection process is performed to allow orphaned data to be deleted (stage 112). Orphaned sites are sites that have an inaccessible URL namespace. This could be caused by a conflict existing in the URL namespace or database corruption. The orphan detection process is described in further detail in FIG. 7.

If validation is successful (decision point 106), and the database being accessed is external to the current live instance of the content management application (decision point 108), then the database is emulated as if it was connected to the current live instance of the content management application (stage 114). The terms "emulated", "emulation", and "performing an emulation" as used herein are meant to include treating an unattached database as though it is attached to a live instance of a content management application on a temporary basis so that normal read or other operations that the user could perform on the live instance will work with the unattached database as well. The user is able to browse and search for specific data in the database (stage 1 16). The user can export data (stage 118) and/or the user can perform a site collection backup of the data (stage 120), to name a few non-limiting examples. Each of these stages will now be described in further detail in the figures that follow.

Figure 2:
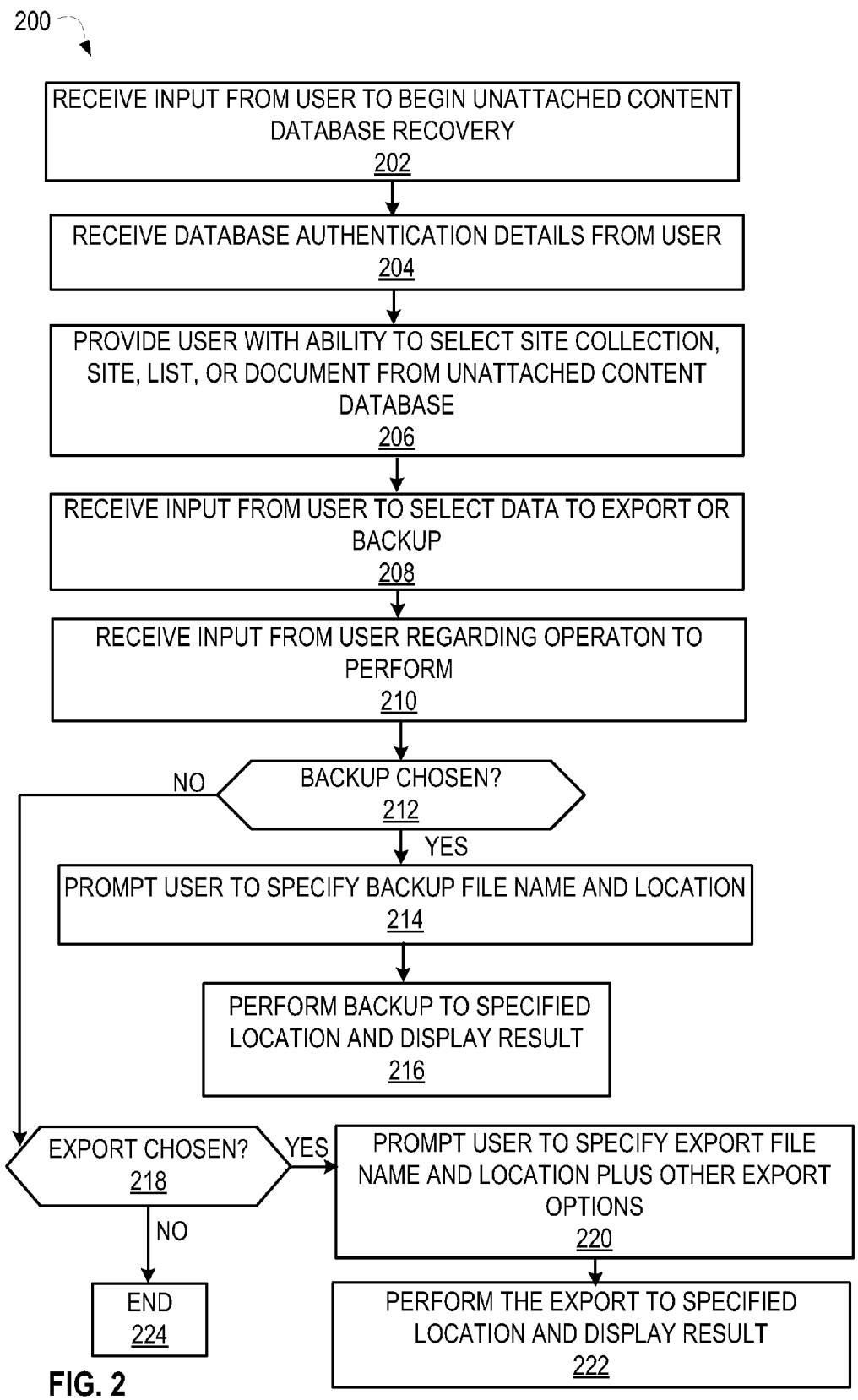
FIG. 2 is a process flow diagram for one implementation illustrating the stages involved in allowing a user to explore and retrieve data from an unattached database of a content management application.

FIG. 2 is a process flow diagram 200 for one implementation illustrating the stages involved in allowing a user to explore and retrieve data from an unattached database of a content management application. Input is received from a user to begin an unattached content database recovery (stage 202). Database authentication details are received from the user (stage 204), such as the database to connect to, and the user name and password or other authentication details that can be used to connect to the specified database. If the database connection can be established successfully, then the user is provided with the ability to select a site collection, site, list, or document from the unattached content database (stage 206). Input is received from the user to select data to export or backup (stage 208), such as the particular site collection, site, list, or document that is desired. Input is received from the user regarding the operation to perform (stage 210), such as whether a database backup is desired or whether an export of the selected data is desired. In the examples discussed herein, database backup and export are described as two options. However, it will be appreciated that in other implementations, fewer, additional, and/or other data retrieval options could be used.

If the database backup option is chosen (decision point 212), then the user is prompted to specify the backup file name and location (stage 214). The backup is performed to the specified location and the result of the backup is optionally displayed or otherwise made available to the user (stage 216). If the export option is chosen (decision point 218), then the user is prompted to specify the export file name and location plus other export options (stage 220). The export is performed to the specified location and the result of the export is optionally displayed or otherwise made available to the user (stage 222). Simulated screens of FIGS. 3-6 will now be used to illustrate this process in further detail.

Figure 3:
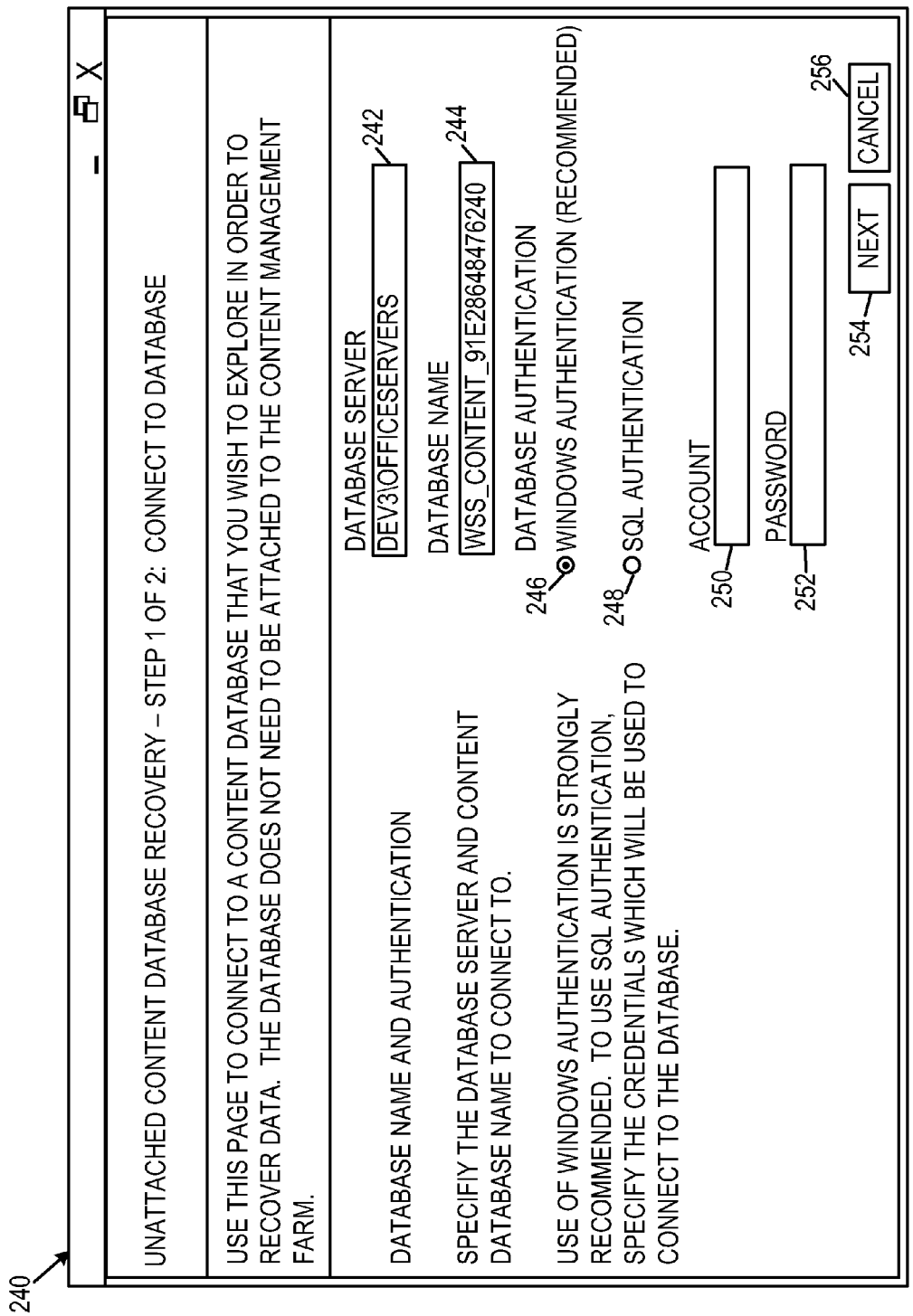
FIG. 3 is a simulated screen for one implementation that illustrates connection settings for connecting to an unattached database of a content management application.

FIG. 3 is a simulated screen 240 for one implementation that illustrates connection settings for connecting to an unattached database of a content management application. The user is able to specify various database connection settings, such as the database server 242, database name 244, and the database authentication method to use. In the example shown, there are two possible types of database authentication: Windows Authentication 246 and SQL Authentication 248. These authentication methods are just examples and other operating system or database authentication methods can be used in alternate implementations. In this example, when SQL Authentication 248 is chosen, then the account 250 and password 252 fields are enabled to allow the user to specify those details. Upon selecting the cancel option 256, the user could cancel the process of connecting to an unattached database to recover data. Upon selecting the next option 254, a screen such as FIG. 4 is displayed to allow the user to select the type of data operation to be performed on the unattached database.

FIG. 4 is a simulated screen 260 for one implementation that illustrates some exemplary data export options for the unattached database selected in FIG. 3. Once a connection has successfully been established to the database specified in FIG. 3 and that database has been verified to contain data for the particular content management application, then the user can browse and select the specific data in the unattached database of the content management application that he wishes to export or backup. For example, a site collection 262 can be specified, which will backup all of the sites under that particular collection. If a specific site in that collection is desired, then the user can select the site option 264. In the current example, there is no specific site selected, and thus all sites in site collection 262 would be exported. The user can select one of the other options 266 to change the site or clear the selection, if one has been chosen.

Once the data itself has been selected, the operation to perform on that data can be chosen. In this example, the user is provided with an option to perform a site collection backup 268 or an export 270. If export 270 is chosen, then the user will need to specify the file name 272 and location to export the selected data to. Other options can also be specified, such as whether or not to overwrite existing files 274, whether or not to include full security 276, which versions 278 to include, and miscellaneous export settings, such as whether to halt on a warning 280, whether to halt on an error 282, whether or not to use a log file 284, and/or what CAB size 286 to use for each file, to name some non-limiting examples. To return to the previous screen and change to a different database, the user can select the previous option 288. Once the user has finished filling out the database export options, then the OK option 290 can be selected to perform the export. The cancel option 292 can be selected to cancel the export. If the user wishes to perform a site collection backup 268 instead of an export 270, then a screen similar to FIG. 5 can be displayed, which is discussed next.

Figure 5:
FIG. 5 is a simulated screen for one implementation that illustrates some exemplary backup options for the unattached database selected in FIG. 3.

FIG. 5 is a simulated screen 300 for one implementation that illustrates some exemplary backup options for the unattached database selected in FIG. 3. In this example, the user has chosen a site collection 302, and a particular site 304 that he wishes to backup. A list 306 can also be chosen if the user wishes to backup a particular list in the selected site 304. Site options 308 can also be specified to change the site or clear the selection. Since the user has selected the operation to perform as the site collection backup 310, the file name 312 will need to be specified to identify the file name and location where the backup should be stored.

Figure 6:
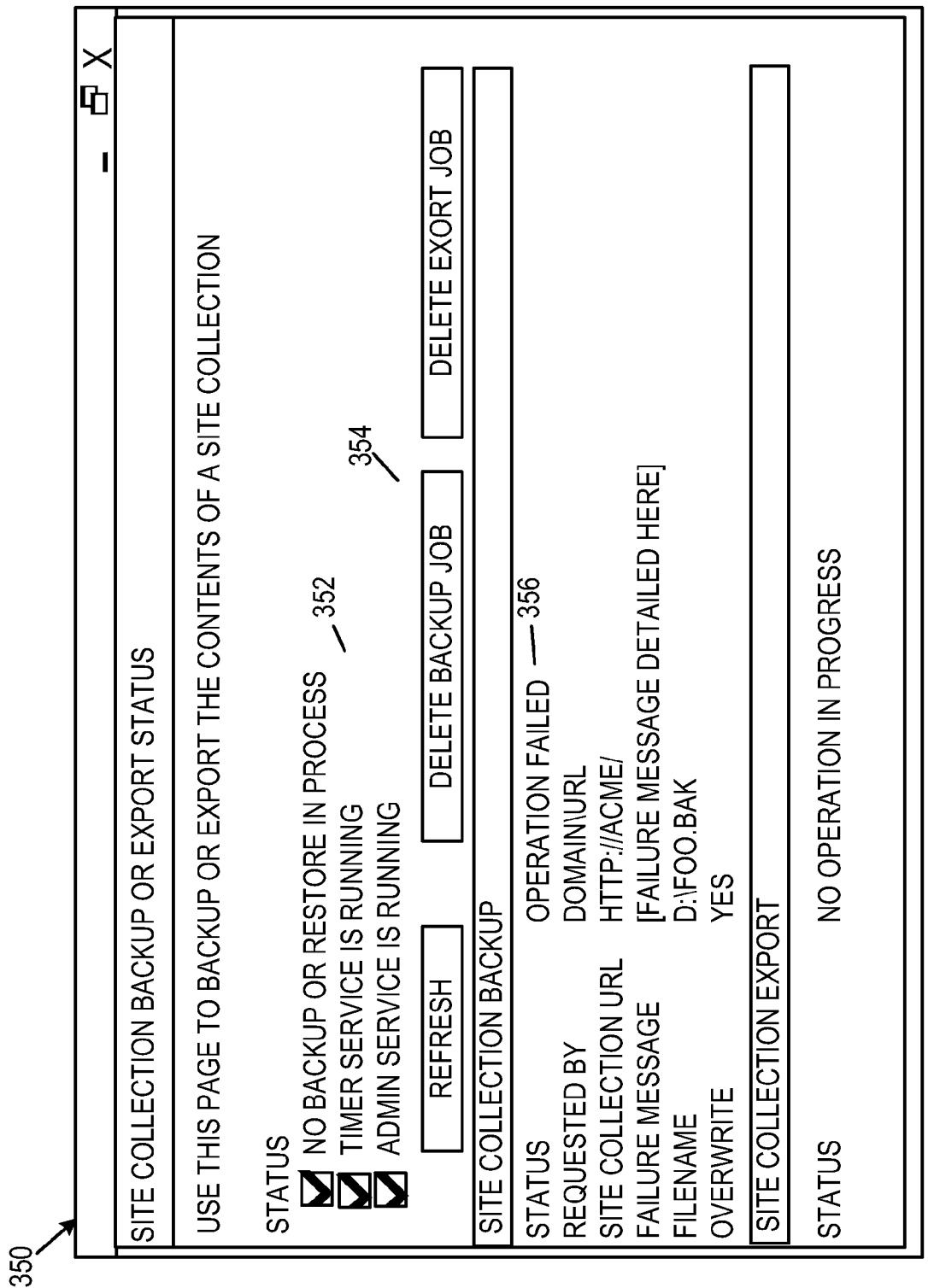
FIG. 6 is a simulated screen for one implementation that illustrates a status of an export or a backup that was performed.

FIG. 6 is a simulated screen 350 for one implementation that illustrates a status of an export or a backup that was performed. In one implementation, once the export operation or the backup operation has been started and/or performed, then a status screen similar to FIG. 6 is displayed or is otherwise accessible to the user to allow the user to determine the status of the operation. In one implementation, the same status screen can be used to display both export and backup statuses. In another implementation, separate status screens can be used. In the example shown in FIG. 6, and overall status 352 of whether or not any backups or exports are currently running is shown, along with options 354 to manage the jobs that are running or that have already finished running. A detailed status 356 about each respective backup or export can also be shown.

Figure 7:
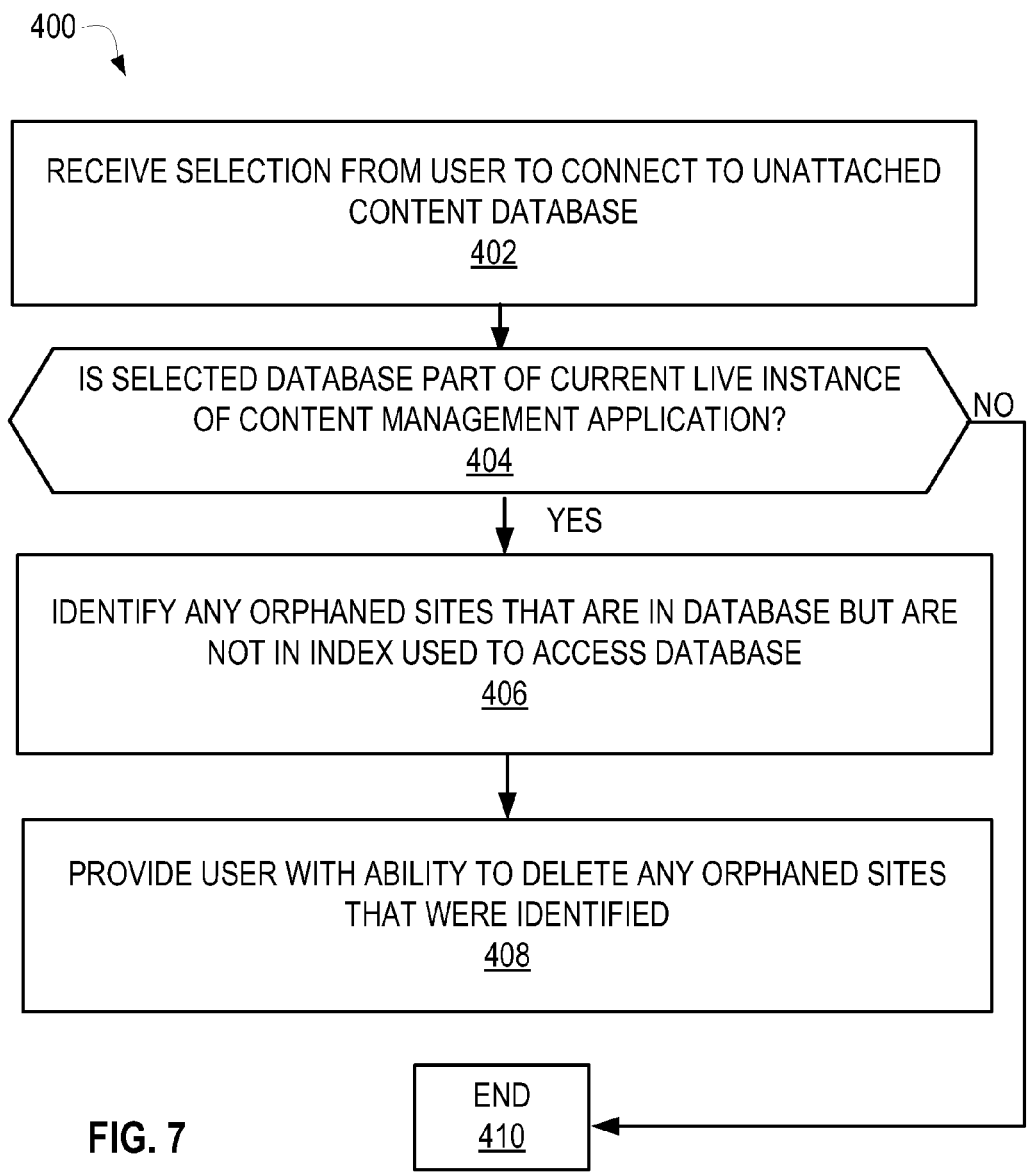
FIG. 7 is a process flow diagram for one implementation illustrating the stages involved in managing orphaned sites in an unattached database of a content management application.

Turning now to FIG. 7, a process flow diagram 400 for one implementation is shown that illustrates the stages involved in managing orphaned sites in an unattached database of a content management application. A selection is received from the user to connect to an unattached content database (stage 402). If the selected database is part of a current live instance of the content management application (decision point 404), then any orphaned sites that are in the database but that are not in the index used to access the database are identified (stage 406). Any orphaned sites that were identified can be deleted upon receiving user confirmation that it is OK to proceed with the delete operation, or the orphaned sites can be deleted automatically (stage 408).

Figure 8:
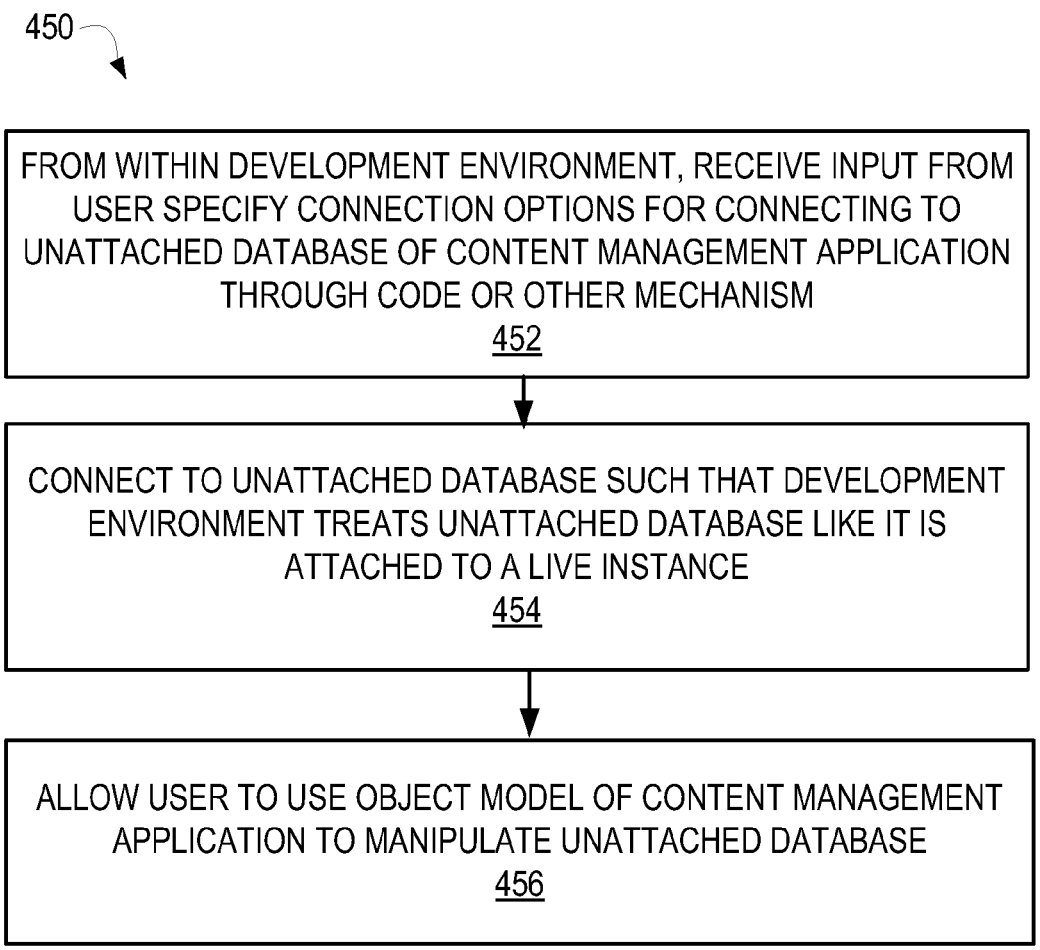
FIG. 8 is a process flow diagram for one implementation illustrating the stages involved in enabling an unattached database of a content management application to be managed programmatically.

FIG. 8 is a process flow diagram 450 for one implementation illustrating the stages involved in enabling an unattached database of a content management application to be managed programmatically. From within a development environment, input is received from a user to specify connection options for connecting to an unattached database of a content management application through code or another mechanism (stage 452). A connection is established to the unattached database such that the development environment treats the unattached database like it is attached to a live instance of the content management application (stage 454). The user is able write code that uses the object model of the content management application to manipulate the unattached database programmatically (stage 456).

Figure 9:
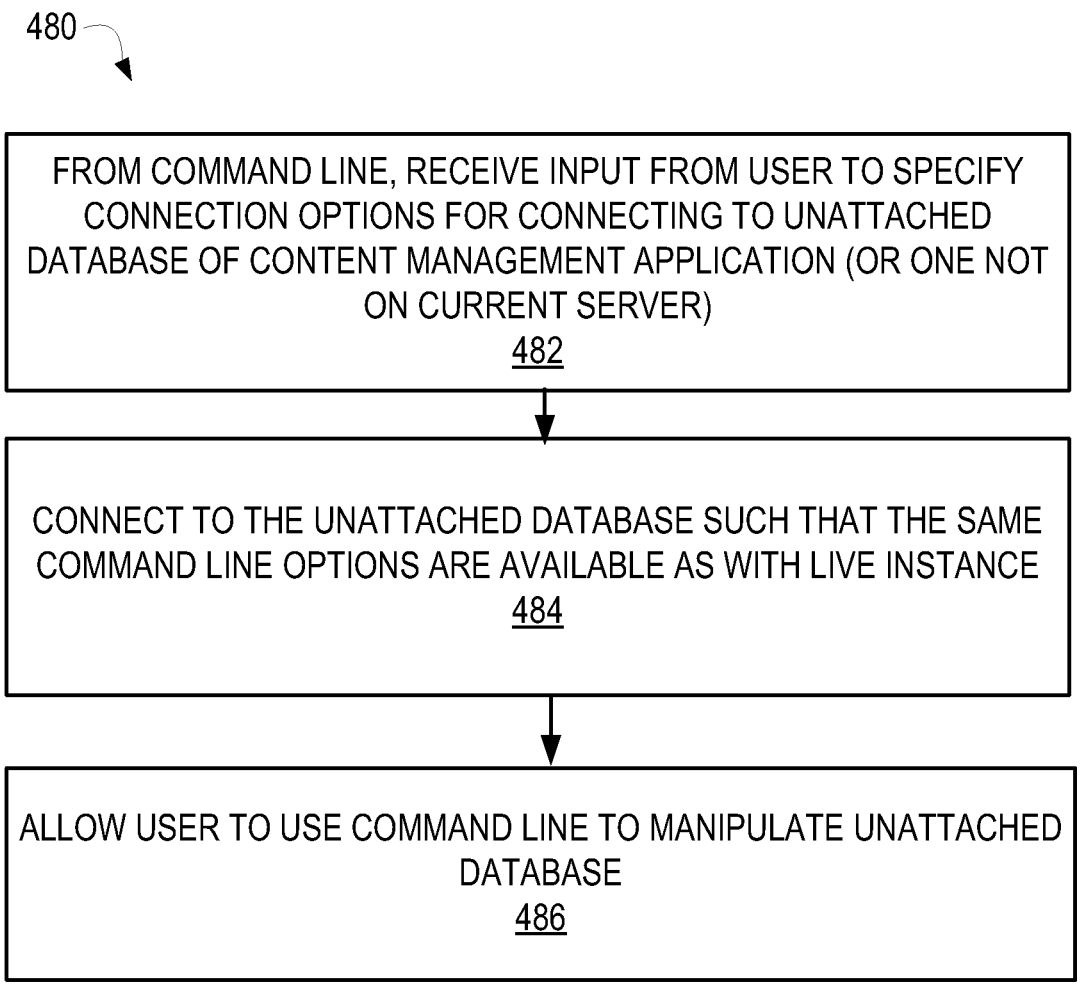
FIG. 9 is a process flow diagram for one implementation illustrating the stages involved in enabling an unattached database of a content management application to be managed from a command line.

FIG. 9 is a process flow diagram 480 for one implementation illustrating the stages involved in enabling an unattached database of a content management application to be managed from a command line. From a command line, input is received from a user to specify connection options for connecting to an unattached database of a content management application, or a database that is not on the current server (stage 482). A connection is established with the unattached database such that the same command line options are available as with a live instance of the content management application (stage 484). The user is able to use the command line to manipulate the unattached database (stage 486) (or an attached database that is located on another server).

Figure 10:
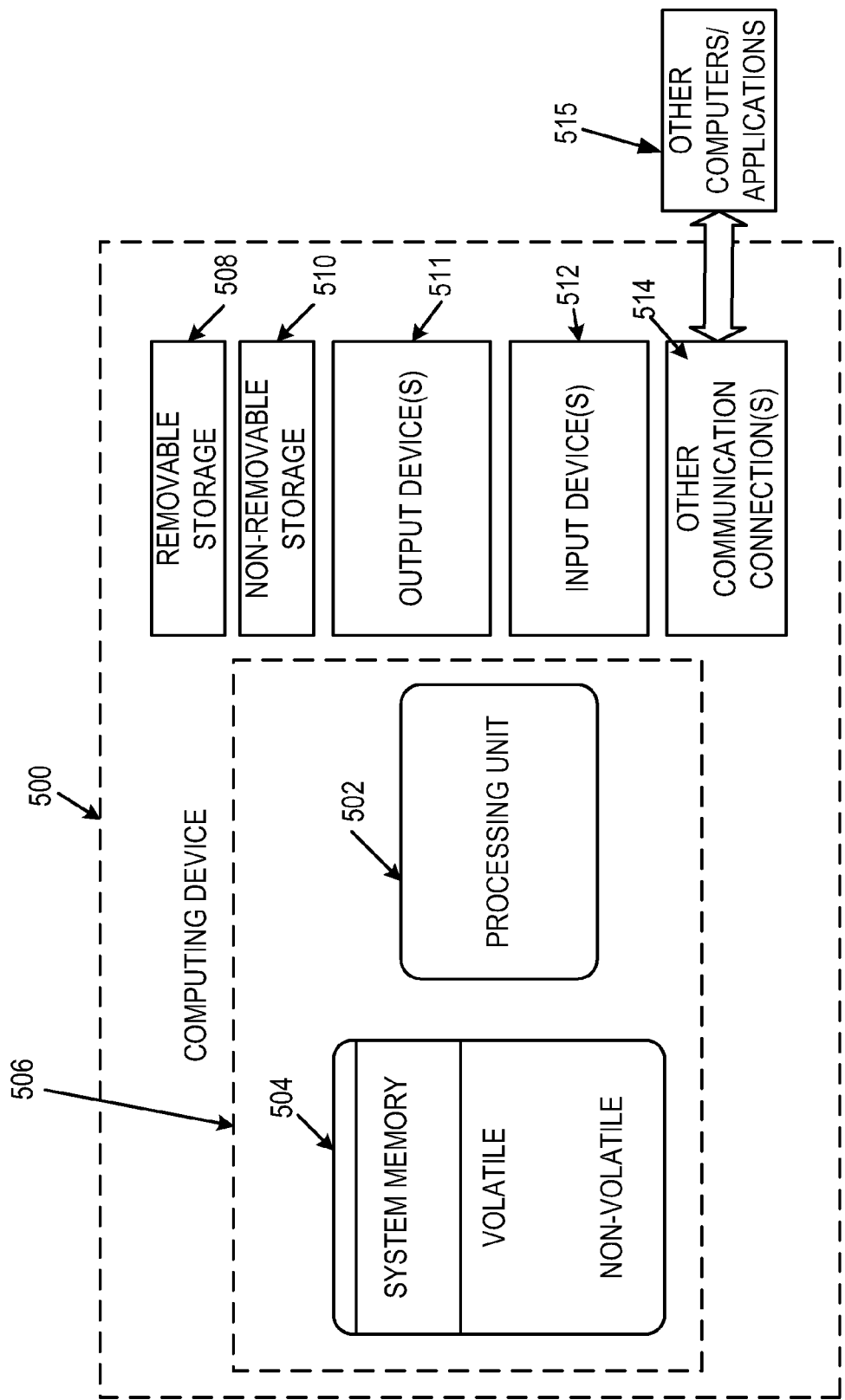
FIG. 10 is a diagrammatic view of a computer system of one implementation.

As shown in FIG. 10, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 10 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 10 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer-implemented method for enabling browsing of data from a content management application comprising:
   receiving a selection to connect to a database of a content management application;
   performing database validation to ensure that the database is a valid version or database schema of the content management application;
   establishing a connection to the database;
   when the database is part of a current live instance of the content management application, determining whether one or more orphaned content management sites are contained in the database, the one or more orphaned content management sites comprising content management sites that have inaccessible uniform resource locator (URL) namespaces;
   when the database is not part of the current live instance of the content management application, performing, by a processing unit, an emulation so that the database is treated like the database is actually attached to the current live instance of the content management application; and
   enabling the database to be browsed.

2. The computer-implemented method of claim 1, wherein the database is contained in a database backup file.

3. The computer-implemented method of claim 1, wherein the database is contained in a database snapshot file.

4. The computer-implemented method of claim 1, wherein the database is contained in an active database instance on a separate computer that is not currently part of a live instance of the content management application.

5. The computer-implemented method of claim 1, wherein the establishing the connection comprises performing a security check to ensure authority to access the database.

6. The computer-implemented method of claim 1, wherein the enabling the database to be browsed includes allowing searching for data that is contained in the database to identify desired content.

7. The computer-implemented method of claim 6, wherein the enabling the database to be browsed further includes allowing extracting of the desired content.

8. The computer-implemented method of claim 6, wherein the enabling the database to be browsed further includes allowing backup of the desired content to a backup file.

9. The computer-implemented method of claim 1, further comprising the steps of:
   deleting one or more portions of the orphaned content management sites.

10. The computer-implemented method of claim 9, wherein the deleting is performed after receiving user confirmation to proceed with the deleting.

* * * * *